US009576257B2

(12) United States Patent
Short et al.

(10) Patent No.: US 9,576,257 B2
(45) Date of Patent: Feb. 21, 2017

(54) INTEGRATING DATA-HANDLING POLICIES INTO A WORKFLOW MODEL

(75) Inventors: Stuart Short, Valbonne (FR); Samuel Paul Kaluvuri, Sophia Antipolis (FR)

(73) Assignee: SAP SE, Walldorf (DE)

( * ) Notice: Subject to any disclaimer, the term of this patent is extended or adjusted under 35 U.S.C. 154(b) by 152 days.

(21) Appl. No.: 13/052,661

(22) Filed: Mar. 21, 2011

(65) Prior Publication Data
US 2012/0246122 A1 Sep. 27, 2012

(51) Int. Cl.
*G06Q 10/06* (2012.01)
*G06F 17/30* (2006.01)

(52) U.S. Cl.
CPC ......... *G06Q 10/06* (2013.01); *G06F 17/30286* (2013.01)

(58) Field of Classification Search
USPC .......................................................... 707/694
See application file for complete search history.

(56) References Cited

U.S. PATENT DOCUMENTS

| 2004/0122853 A1* | 6/2004 | Moore ............. G06Q 10/06316 |
| 2007/0179987 A1* | 8/2007 | Lim .............................. 707/200 |
| 2008/0183517 A1* | 7/2008 | Hamadi et al. ................... 705/7 |
| 2009/0281777 A1* | 11/2009 | Baeuerle et al. .................. 703/6 |
| 2010/0299763 A1* | 11/2010 | Marcus ................. G06Q 10/06 726/30 |

OTHER PUBLICATIONS

Alhaqbani et al. "Privacy-Aware Workflow Management", BPM Center Report (2009).*
Alhaqbani, B, et al., "Privacy-Aware Workflow Management", BPM Center Report BPM-09-06, [Online]. Retrieved from the Internet: <URL: http://wwwis.win.tue.nl/~wvdaalst/BPMcenter/reports/2009/BPM-09-06.pdf>, (2009), 24 pgs.
Chebbi, I, et al., "Workflow abstraction for privacy preservation", Proceedings of the 2007 International Conference on Web Information Systems Engineering LNCS, (2007), 166-177.
Chinosi, M, et al., "Integrating Privacy Policies into Business Processes", Journal of Research and Practice in Information Technology vol. 41, No. 2, (2009), 155-170.
Stone, Eddy, et al., "The effects of information management policies on reactions of human resource information systems: an integration of privacy and procedural justice perspectives", Personnel psychology 52(2), (1999), 335-358.

* cited by examiner

*Primary Examiner* — Hosain Alam
*Assistant Examiner* — Tuan-Khanh Phan
(74) *Attorney, Agent, or Firm* — Schwegman Lundberg & Woessner, P.A.

(57) ABSTRACT

A method and system for integrating data-handling policies into a computer-implemented workflow model is provided. In one embodiment, a workflow editor implemented using one or more processors may include a privacy manager module configured to permit a business process designer to integrate data handling policies into a workflow model. A privacy manager module, or simply a privacy manager, may also be configured to execute a consistency check with respect to newly-created and existing data handling policies to determine whether there is a conflict among any of the data-handling policies associated with tasks and data objects of the workflow model.

12 Claims, 8 Drawing Sheets

INTEGRATING DATA-HANDLING POLICIES INTO A WORKFLOW MODEL

TECHNICAL FIELD

This disclosure relates generally to the field of business process management and particularly to a method and system for integrating data-handling policies into a workflow model.

BACKGROUND

Business process models play an important role in facilitating the understanding of how companies operate and in providing a blueprint for software systems supporting these processes. The automation of a business process, during which documents, information, or tasks are passed from one participant to another for action according to a set of procedural rules, may be termed a workflow. A workflow may be expressed by a workflow model (also referred to as a process model).

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
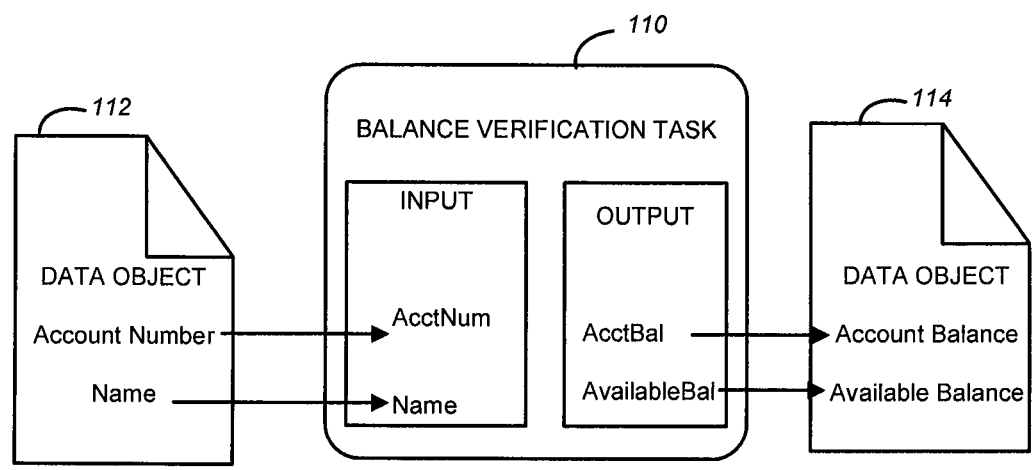
FIG. 1 is a diagram illustrating a workflow task and its data context, in accordance with one example embodiment.

A method and system for integrating data-handling policies into a workflow model is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on administration of Java-based servers and related environments, the embodiments are given merely for clarity in disclosure. Thus, any type of server environment, including various system architectures, may employ various embodiments of the application-centric resources system and method described herein and is considered as being within a scope of the present invention.

A workflow model may represent a business process, such as, e.g., a process for receiving and processing an application for a loan from a bank customer. When a bank customer—a potential borrower—submits an application for a loan, the loan origination process is initiated. This process may entail the formalization, evaluation and eventual decision on the applicant's request. In order to do this, three main actors may be involved within the bank, namely, pre-processing clerk, post-processing clerk, and a manager. The pre-processing clerk receives a loan request from a customer and starts the application. Once the loan applicant's identity has been verified, the post-processing clerk evaluates the customer's credit rating, which may be done through both internal and external rating mechanisms. The external mechanism may involve contacting a trusted third-party credit bureau that can derive information about the applicant from various sources including publicly available records. In the event that the applicant's rating meets the requirements of the bank, the clerk selects the appropriate bundled product and forwards the application to the manager for final evaluation and eventual signature. On approval, a loan account is then opened for the loan applicant.

A loan origination scenario may contain restrictions on how data should be processed. For example, with respect to services that are internal to the bank organization, the applicant may wish that the information she supplied may only be used for administrative needs and may not be used for advertising, that the advertising department may not read this information, and that the information is only to be used for the lifespan of the loan application unless the loan application successfully processed. Restrictions on data handling may also be specified with respect to services that are external to the bank organization. For example, a credit bureau may specify that credit rating information for a customer may only be requested by a bank employee having a manager role, that the obtained information may only be used for administrative purposes, and that the obtained information may only be stored for a certain period of time. An external service, such as a credit bureau, may use a Service Level Agreement to express its data handling policy.

A computer-implemented workflow model typically comprises a plurality of tasks and data objects. A task represents an activity performed in the course of a business process (e.g., verifying credit worthiness of a loan applicant or calculating account balance for a bank customer). Any data that is consumed by a task together with any data that is produced by the task is referred to as the data context of that task. The context data of a task is stored as one or more data objects in a workflow model. For example, a balance verification task in a workflow model may take the name and the account number of a customer as input and produce account balance value and available balance value as output, as shown in FIG. 1.

FIG. 1 is a diagram 100 of a workflow task and its data context provided in a computer-implemented workflow model. As shown in FIG. 1, balance verification task 110 uses the name and the account number fields of data object 112 as input. The output generated by the balance verification task 110 is stored in account balance and available balance fields of data object 114. A workflow model may be designed utilizing a computing application for authoring workflow models termed a workflow editor.

In one embodiment, a workflow editor may include a privacy manager module configured to permit a business process designer to integrate data handling policies into a workflow model. A privacy manager module, or simply a privacy manager, may also be configured to execute a consistency check with respect to newly-created and existing data handling policies to determine whether there is a conflict among any of the data-handling policies associated with tasks and data objects of the workflow model. A workflow designer may utilize a privacy manager to associate a data handling policy with a task in a workflow model. A data handling policy associated with a task may include a consumption policy, an output consumption policy, or both. An input consumption policy for a task specifies one or more rules with respect to how the task can consume input data, while a output consumption policy specifies one or more rules with respect to how the data produced by the task can be utilized. For example, in a workflow model representing a loan origination process, an input consumption policy for a task may include a rule indicating that the data consumed by the task as input may only be used for administrative needs and may not be used for advertising. An output consumption policy for the same task may include a rule indicating that data being output by the task (e.g., data obtained by the task from external services) may only be stored for a certain period of time. Data-handling policies created utilizing a privacy manager may be stored as associated with the subject workflow model, e.g., as an XML (eXtended Markup Language) file.

Figure 2:
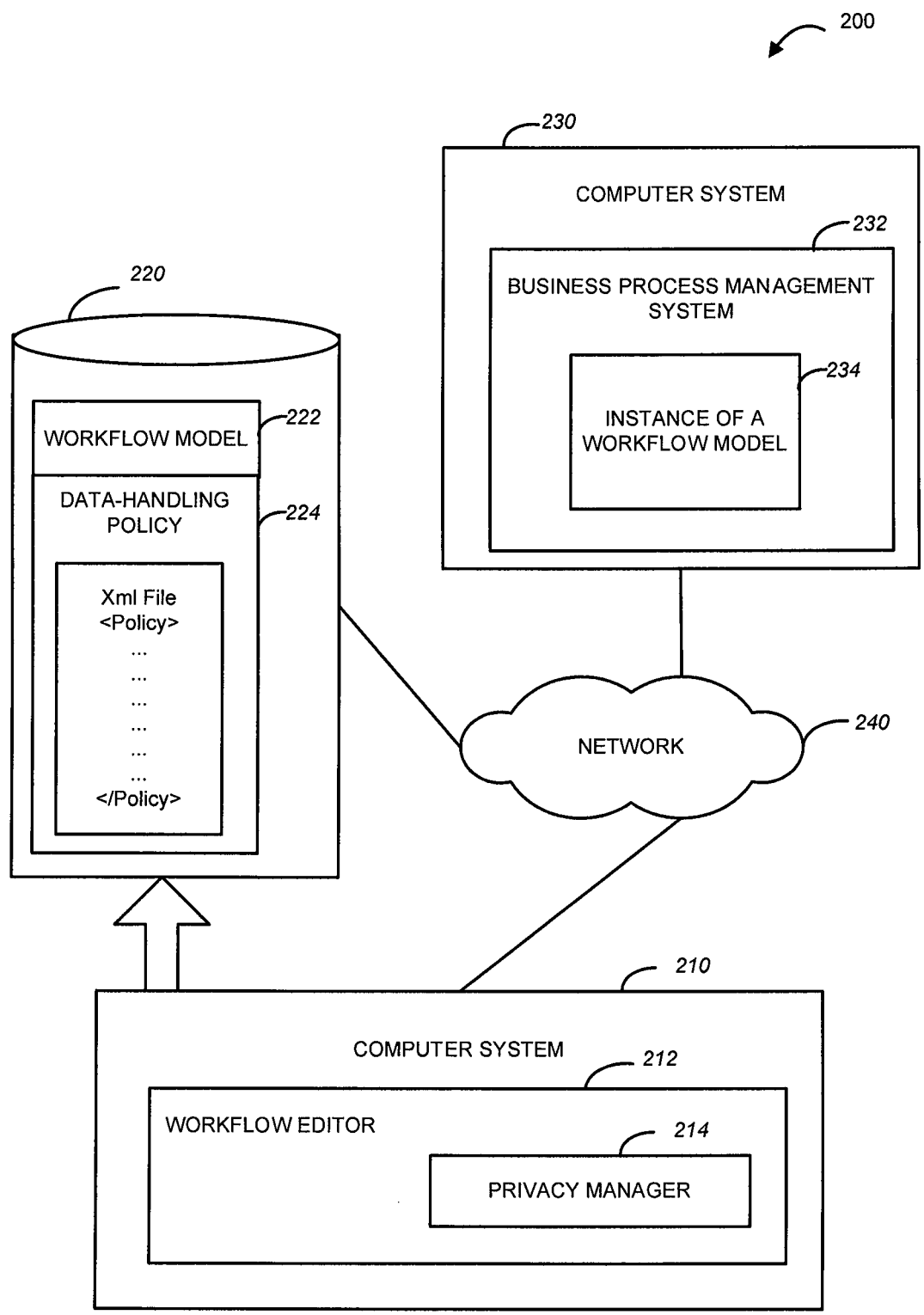
FIG. 2 is a diagrammatic representation of a network environment within which an example method and system for integrating data-handling policies into a workflow model may be implemented.

FIG. 2 is a diagrammatic representation of a network environment 200 within which an example method and system for integrating data-handling policies into a workflow model may be implemented. As shown in FIG. 2, the system 200 comprises a computer system 210 that hosts a workflow editor 212. The workflow editor 212 is provided with a privacy manager 214. While the workflow editor 212 permits a user to design workflow models, the privacy manager 214 may be configured to provide a user interface for creating data-handling policies for tasks and objects of a workflow model and also to run a consistency check on the data-handling policies associated with a workflow. For example, a designer may utilize the user interface provided by the privacy manager 214 to create a data-handling policy for a data collection task in a loan application workflow model. The designer may then request that the privacy manager executes a consistency check. As a result of the privacy manager 214 performing a consistency check, the designer may be presented with an alert or a notification by the user interface of the privacy manager 214 that the newly-created data-handling policy for the data collection task should include additional rules or restrictions on the use of output data of the data collection task in order to be consistent with data-handling policy for another task in the loan application workflow model (e.g., a task that takes as input the output of the data collection task). The data-handling policy created for a workflow model using the privacy manager 214 may be stored in a repository 220, e.g., as an XML file 224 associated with a workflow model 222.

Workflow models and their associated data-handling policies stored in the repository 220 may be utilized by a business process management system 232 hosted by a computer system 230. The computer systems 210 and 230, as well as the repository 220 may be connected via a communications network, which may be a public network 240 (e.g., the Internet, a wireless network, etc.) or a private network (e.g., a local area network (LAN), a wide area network (WAN), Intranet, etc.).

As shown in FIG. 2, the business process management system 232 hosted by the computer system 230 may be executing a workflow model instance 234. The business process management system 232 may utilize a language that has a well-defined structure in order to express data-handling policies associated with a tasks and data objects in a workflow model. For example, business process management system 232 may utilize eXtensible Access Control Markup Language (XACML) that uses the structure of Subject, Action, Resource (as well as optional conditions or rules) and provides a processing model that renders a decision of whether a resource should be accessed or not. An example of code written in XACML is shown in Table 1 below.

TABLE 1

```
<Subject>
    <Attribute AttributeId="urn:oasis:names:tc:xacml:1.0:subject:subject-
    id"
        DataType="urn:oasis:names:tc:xacml:1.0:data-
        type:rfc822Name">
        <AttributeValue>PostProcessorClerk</AttributeValue>
    </Attribute>
</Subject>
<Resource>
    <Attribute AttributeId=
    "urn:oasis:names:tc:xacml:1.0:resource:resource-id"
        DataType="http://www.w3.org/2001/XMLSchema#string">
        <AttributeValue>Ethnic_Background</AttributeValue>
    </Attribute>
</Resource>
<Action>
    <Attribute AttributeId="urn:oasis:names:tc:xacml:1.0:action:action-id"
        DataType="http://www.w3.org/2001/XMLSchema#string">
        <AttributeValue>Deny</AttributeValue>
    </Attribute>
</Action>
```

Figure 3:
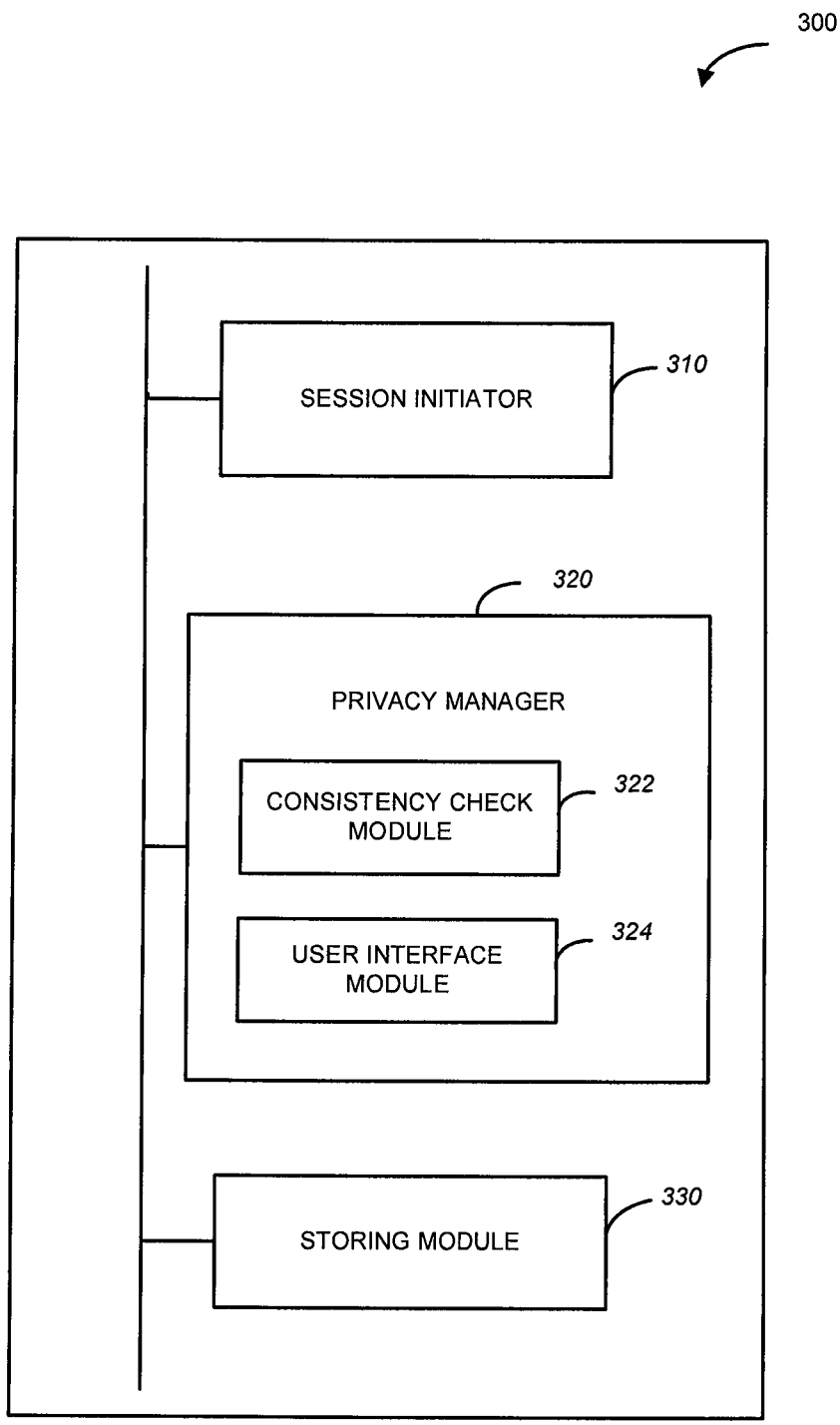
FIG. 3 is block diagram of a system for integrating data-handling policies into a workflow model, in accordance with one example embodiment.

FIG. 3 is a block diagram of a system 300 for integrating data-handling policies into a workflow model, in accordance with one example embodiment. Some of the modules shown as part of the system 300 are provided by a privacy manager (e.g., the privacy manager 214 shown in FIG. 2), while other modules are provided by a workflow editor (e.g., the workflow editor 212 shown in FIG. 2). As shown in FIG. 3, the system 300 comprises a session initiator 310, a privacy manager 320, and a storing module 330. The session initiator 310 may be configured to commence an authoring session for a workflow model. As mentioned above, a workflow model may comprise a plurality of tasks and one or more data objects. One or more fields of a data object (or one or more fields of two or more data objects) may serve as input data for a task in a workflow model. Conversely, one or more fields of a data object (or one or more fields of two or more data objects) may store output data produced by a task in a workflow model.

The privacy manager 320 may be configured to generate a data-handling policy for a data context of a task, where the data context for a task comprises data that serves as input for a task, data that is the output of the task, or both. The aspects of a data-handling policy that relate to data that serves as input for a task may be referred to as the input consumption policy, while the aspects of a data-handling policy that relate to data that is the output of the task may be referred to as the output consumption policy. The data-handling policy for a task in a workflow model may have a validity period indicating to a business process management system executing an instance of the workflow model that the policy should be re-loaded if the validity period has expired. A data-handling policy may also indicate a purpose for which data is intended, one or more recipients of the data, and retention period for the data. As mentioned above, a data-handling policy may be stored as an XML file. A storing module 310 may be configured to store the data-handling policy as associated with the workflow model.

The privacy manager 320, in one example embodiment, may include a consistency check module 322 and a user interface module 324. The consistency check module 322 may be configured to execute consistency check to determine whether a data-handling policy is consistent with other data-handling policies associated with the workflow model. If any inconsistencies are identified by the consistency check module 322, it presents a warning to the user. For example, if a newly-created data-handling policy specified retention period for data that is less than the retention period specified in a data-handling policy for another task that uses the same data, the consistency check module 322 detects the inconsistency and issues a warning using the user interface module 324.

In one embodiment, the location of the data-handling policy file for a workflow model may be specified in a WSDL file. When a designer of a workflow model imports a WSDL file associated with tasks in the workflow model, the privacy manager 320 extracts the uniform resource locator (URL) from the WSDL file, retrieves the existing data-handling policy file, parses it, and displays the details of the data-handling policy in the privacy view workspace presented by the user interface module 324. An example WSDL file containing the URL of the data-handling policy file is shown in Table 2 below.

TABLE 2

<wsdl:definitions targetNamespace="http://example.com/sample/ws/"
xmlns:wsdl="http://schemas.xmlsoap.org/wsdl/"
xmlns:xs="http://www.w3.org/2001/XMLSchema"
xmlns:tns="http://example.com/sample/ws/">
<wsdl:documentation>
@PolicyLink=Yes
@PolicyURL=http://example.com/samplePrivacyPolicy.xml
</wsdl:documentation>
<wsdl:types>
<!-- --- -->
</wsdl:types>

Figure 4:
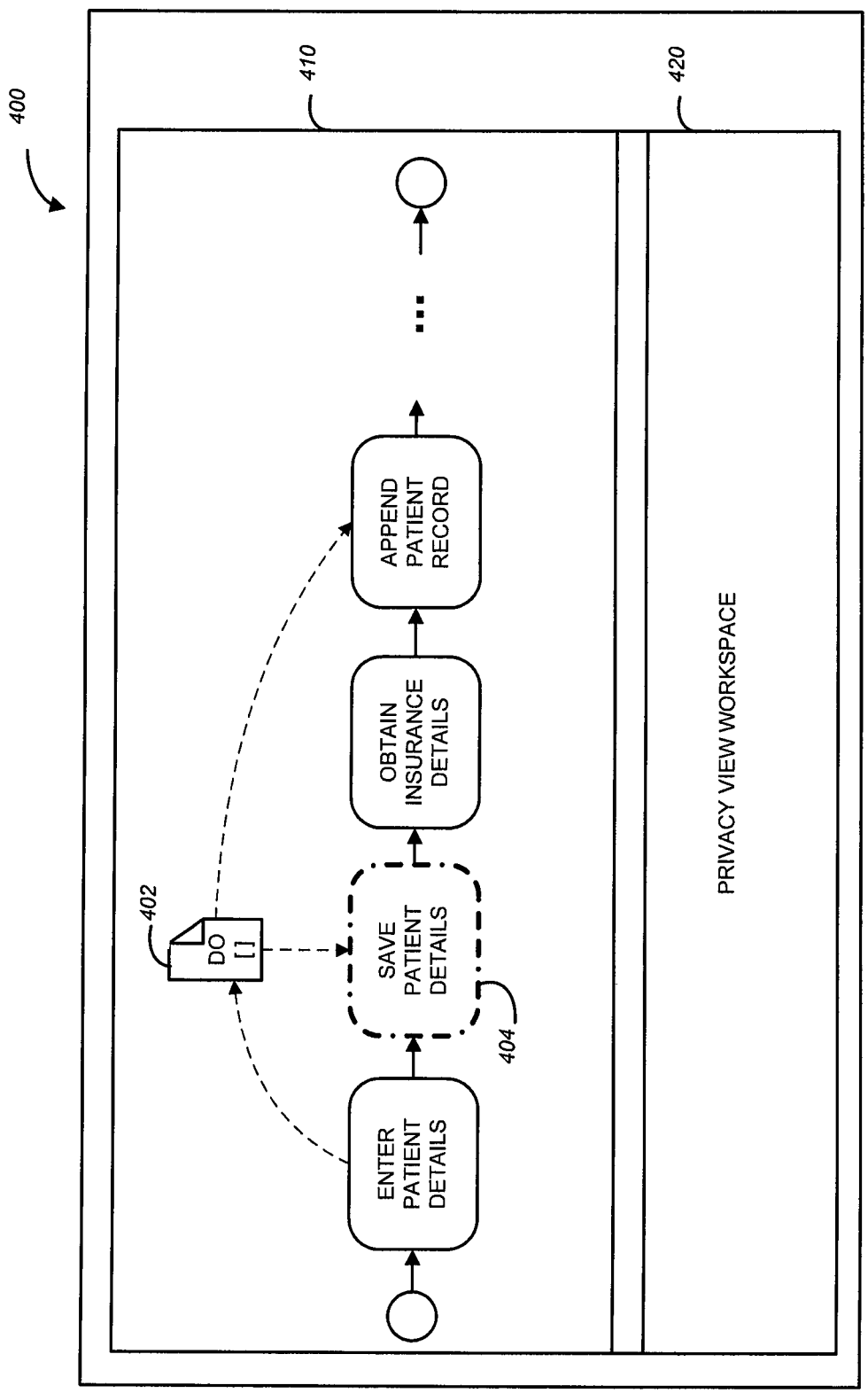
FIG. 4. is a diagram illustrating a workflow workspace and an associated privacy view workspace, in accordance with an example embodiment.

As mentioned above, the data-handling policies associated with a workflow model may emanate from services that are internal or external with respect to the workflow model. Data-handling policies associated with a service that is external with respect to the workflow model may be expressed in a Service Level Agreement (SLA). The privacy manager 320 may be configured to permit importing of policies expressed in an SLA to be stored as data-handling policies associated with a workflow model. The importing of an SLA may be requested by a user utilizing a privacy view workspace provided by the user interface module 324. A privacy view workspace may be presented as associated with a workflow model. FIG. 4. is a diagram 400 illustrating a workflow workspace 410 and an associated privacy view workspace 420. A workflow model diagram shown in the workflow workspace 410 comprises several tasks (e.g., "enter patient details" task, "save patient details" task 404, etc.) and a data object 402. Some of the tasks represent human activities (e.g., "enter patient details" task), while other tasks represent automated activities (e.g., "save patient details" task 404). The task 404 is shown with a broken bold line to indicate the selection of that task. The privacy view workspace 420 may be used to create a data-handling policy for the selected task 404 (also referred to as the subject task) and its context data.

Figure 5:
FIG. 5. is a diagram illustrating a privacy view workspace, in accordance with an example embodiment.

FIG. 5. is a diagram illustrating a privacy view workspace 500, in accordance with an example embodiment. The privacy view workspace 500, in one embodiment, corresponds to the privacy view workspace 420 shown in FIG. 4. As shown in FIG. 4, the privacy view workspace 500 permits a designer of a workflow model to indicate whether the data-handling policy for the subject task is created by importing a Service Level Agreement (by checking or not checking a checkbox 502), to specify permitted and restricted purposes for the context data of the subject task, to specify permitted and restricted recipients of the context data of the subject task, to indicate retention obligation for the context data of the subject task. "Policy type" field, in one embodiment, is included in the privacy view workspace 500 to permit a designed to indicate whether the data handling policy associated with the subject task is an organizational policy or an inter-organizational policy. The privacy view workspace 500 may also present visual controls for requesting a consistency check, for clearing the policy (e.g., by deleting all rules associated with the subject task), and for saving the policy (e.g., as an XML file associated with the workflow model). An example method for integrating data-handling policies into a workflow model can be described with reference to FIG. 6.

Figure 6:
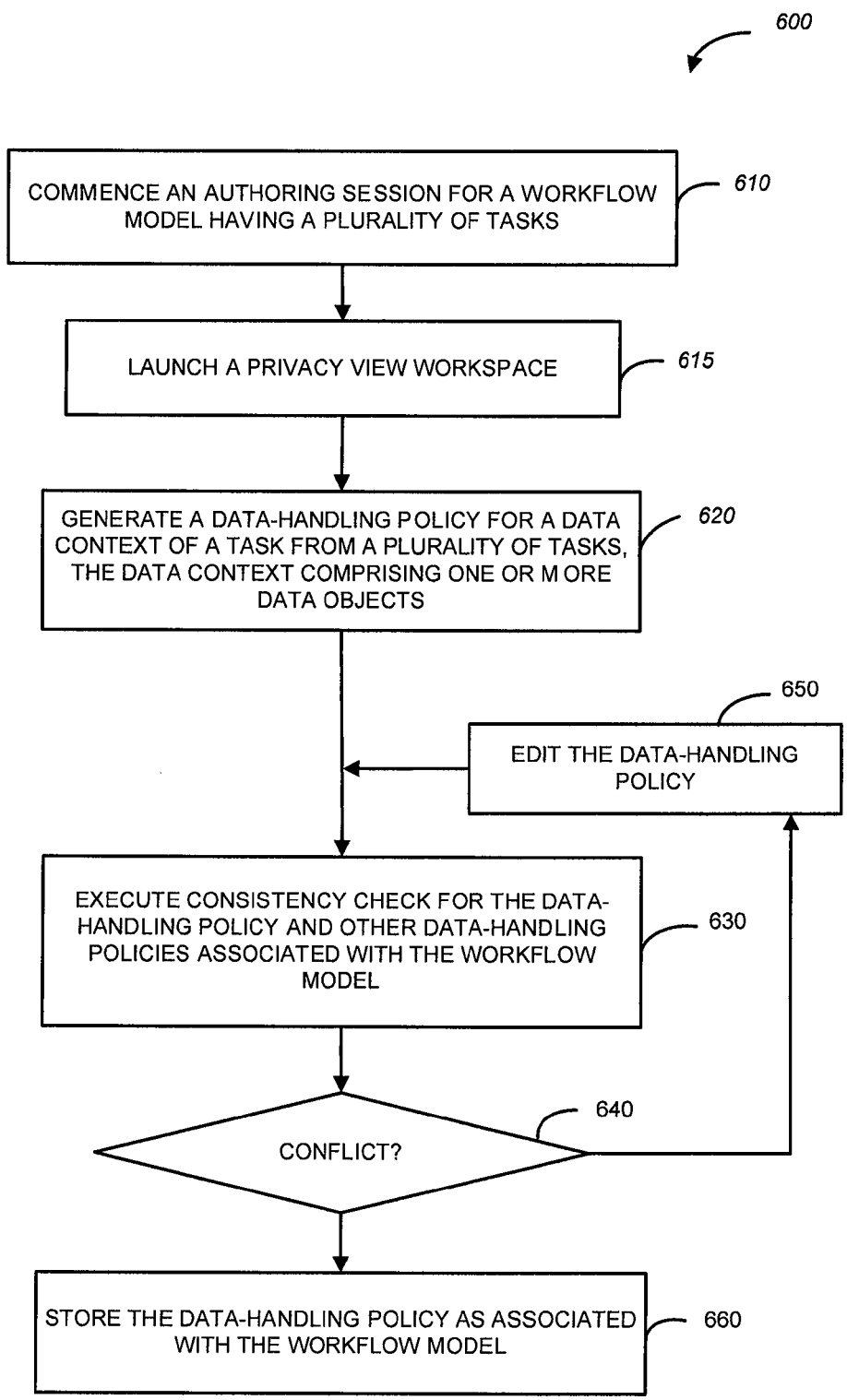
FIG. 6 is an example user interface illustrating integrating data-handling policies into a workflow model, in accordance with an example embodiment.

FIG. 6 is a flow chart of a method 600 for integrating data-handling policies into a workflow model, according to one example embodiment. The method 600 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the computer system 210 of FIG. 2 and, specifically, at the system 300 shown in FIG. 3.

As shown in FIG. 6, the method 600 commences at operation 610, when the session initiator 310 of FIG. 3 commences an authoring session for a workflow model. As explained above, a workflow model comprises one or more tasks and one or more data objects. At operation 615, a privacy view workspace is launched, e.g., in response to an explicit request or in response to selecting a task from the workflow model. At operation 620, the privacy manager 320 of FIG. 3 generates a data-handling policy for one or more data objects in the data context of the selected task. A data-handling policy for a task may be created based on the user input provided via the privacy view workspace or, e.g., by importing rules associated with a Service Level Agreement.

At operation 630, the consistency check module 322 of FIG. 3 performs consistency check for the generated data-handling policy and other data-handling policies associated with the workflow model. If no conflicts are determined (operation 640), the generated data-handling policy is stored as associated with the workflow model (operation 660). If a conflict is identified (operation 640), the designer is provided with an error message. After the data-handling policy is edited (operation 650) to resolve the identified conflict, consistency check module 322 of FIG. 3 performs another consistency. The operations 630-650 may be repeated until all inconsistencies among data-handling policies associated with the workflow model are resolved, such that the generated data-handling policy can stored at operation 660.

In one embodiment, a system for integrating data-handling policies into a workflow model (such as, e.g., the privacy manager 214 of FIG. 2) may be implemented as a plug-in (termed privacy plug-in) for a workflow editor. A privacy plug-in, in one embodiment, is maintained in a class called Activator.java. This class is contained in a package that contains the plug-in ID, and if there are any initializations of variables or objects that need to be done before the "view" loads, it can be done so in the Activator Class. This Activator class extends the AbstractUIPlug-in Class, as shown in Table 3 below.

TABLE 3

```
public void start(BundleContext context) throws Exception {
    super.start(context);
    plug-in = this;
}
public void stop(BundleContext context) throws Exception {
    plug-in = null;
    super.stop(context);
}
```

For every plug-in project that is created, a plug-in.xml file is created in the project. This plug-in.xml file contains configuration details for the project. The code included between the plug-in tags (<plug-in> . . . </plug-in>) is shown below in Table 4. As shown in Table 4, the 'class' attribute points to the class that contains the code to generate a privacy view workspace.

TABLE 4

```
<extension
    point="org.eclipse.ui.views">
<category
    name="PrivacyProperties"
    id="PrivacyManager">
</category>
<view
    name="Privacy Properties"
    icon="icons/sample.gif"
    category="PrivacyManager"
    class="com.sap.demo.privacy.views.PrivacyPropertiesView"
    id="com.sap.demo.privacy.views.PrivacyPropertiesView">
</view>
</extension>
```

A privacy plug-in may have dependencies on other plug-ins, which may be configured in the MANIFEST.MF file that is created for every plug-in that is developed. If the dependent plug-in version changes such that they no longer support the existing framework, the privacy plug-in code may be updated accordingly.

As described above, a designer may be permitted to add data-handling policies to tasks in a workflow model by accessing a privacy view workspace. A privacy view workspace contains user interface (UI) elements for the designer to enter the properties, such as textboxes, check boxes, drop-down menus etc. These UI elements can be created using the Standard Widget Toolkit (SWT) for Java designed to provide efficient, portable access to the user-interface facilities of the operating systems on which it is implemented. The classes that may be utilized to design a privacy view workspace and functions for handling the UI elements may be contained in a privacy views package. A privacy views package may be generated by developing a class that extends the java class "viewpart." In one embodiment, a class "PrivacyPropertiesView" is used to create the privacy view workspace. A privacy view workspace may have three basic functionalities to capture a business management (BPM) object (e.g., a task) selected by the process designer and to enable a designer to assign privacy properties to the object and to create the UI elements. Example code for creating a privacy view workspace is shown below in Table 5.

TABLE 5

```
@Override
public void createPartControl(Composite parent) {
Composite composite=null;
    ScrolledComposite sc = new ScrolledComposite(parent,
    SWT.H_SCROLL |
            SWT.V_SCROLL | SWT.BORDER);
        composite = new Composite(sc, SWT.NONE);
            composite.setLayout(new FillLayout( ));
            composite.setSize(300,100);
            sc.setContent(composite);
            sc.setExpandHorizontal(true);
            sc.setExpandVertical(true);
            sc.setMinSize(composite.computeSize(300, 100));
    //call the class to create the UI Elements.
        ViewControls vc=new ViewControls( );
        vc.createViewForm(composite);
    getSite( ).getWorkbenchWindow( ).getSelectionService( ).-
    addSelectionListener(listener);
}
```

The code shown in Table 5 above creates a scrollable form in the privacy view workspace; the ViewControls class creates the UI elements and the functions to handle it. As can be inferred from the last line of the function, there is a selection listener that is being added to the Viewpart. A selection listener captures the user's selection of a task, to which a data-handling policy to be assigned. A selection listener has a function, "showSelection (sourcepart, selection)," which performs the operations of loading new data, clearing data, saving data and other similar functions on the user interface form.

The selection listener is declared as shown in Table 6 below. In one embodiment, the selection listener ignores selections of objects or text from the privacy view workspace.

TABLE 6

```
private ISelectionListener listener = new ISelectionListener( ) {
    public void selectionChanged(IWorkbenchPart sourcepart,
    ISelection selection) {
    // we ignore the selections from the Privacy View
        if (sourcepart != PrivacyPropertiesView.this) {
            showSelection(sourcepart, selection);
        }
    }
}
```

The 'sourcepart' value indicates the part of the display area from which the selection has been made. It could be a project explorer, outline view, or the Business Process editor. The 'selection' attribute value indicates the selected object—it could be an object, a tree (outline view), or text (from an XML editor, for example).

The showSelection method is configured to determine the location of the resource on which the selection has taken place. Then, the WSDL folder for the project needs to be determined, for retrieving the SLA at a later stage. After the WSDL folder is calculated, it needs to be saved in the viewcontrol class. In the same way, we save the resource—the resource on which the selection has taken place in the view controls; this is done in order to display the messages in the problem view. A connection needs to be established with the modeling infrastructure (MOIN) meta-model to access the business process objects (workflow model objects).

Before the operations are performed to change the user interface, the final step is to load all these properties in the viewcontrol, as the viewcontrol class needs these parameters to perform the operations. Example code is shown in Table 7 below.

TABLE 7

```
Public void showSelection(IWorkbenchPart sourcepart, ISelection
selection) {
        window =
    PlatformUI.getWorkbench( ).getActiveWorkbenchWindow( );
//...............
            vc.setWSDLLocation(PathNameTest);
//...............
            IResource resource =
workspace.getRoot( ).getFile(newpath);
            vc.setWorkspace(workspace);
            vc.setResource(resource);
        }
    }
//    Establish connection with the BPM Model
    createConnection( );
// Set the model parameters that have been derived from connecting to the
model.
    vc.setModelParameters(connection,collaboration,PathName,
    FileName);
```

The showSelection method will now need to perform operations on the selections of the process designer in a BPM. The first step is to check if the selection is a structured selection, ignore the other selections, and disable the view.

The second check is to check whether the selection is a BPM Object or not; this can be done by checking if the selected object is an instance of "ContainerShapeEditPart." Finally, a check has to be performed to determine if the selection is a BPM activity. A function checkActivityType is used to check if the selected object is a human or automated activity and returns it back to the showSelection method. Example code is shown in Table 8 below.

TABLE 8

```
    if(selection instanceof IStructuredSelection)
    {
//.........
        StructuredSelection SS=(StructuredSelection)selection;
        if(!(SS.getFirstElement( ) instanceof ContainerShapeEditPart))
            return;
    ContainerShapeEditPart cs=(ContainerShapeEditPart)
SS.getFirstElement( );
List<RefObject>
RObjs=cs.getPictogramElement( ).getLink( ).getBusinessObjects( );
        for(RefObject RObj:RObjs){
            ObjName=RObj.get_Mri( ).toString( );
    ObjType=checkActivityType(RObj.get_Mri( ).toString( ));
        }
```

After capturing the right objects, the showSelection method needs to perform some actions on the UI form. Actions like clearing the text fields, loading data, saving the data etc. Also when an object is selected, there needs to be a function that has to check if there are any errors associated with the object. Example code is shown in Table 9 below.

TABLE 9

```
//************** if any error found, change the image of the form.
            vc.setFormImage(ObjName);
            vc.toggleForm(true);
            vc.clearTextFields( );
            vc.toggleEnableForm(true);
            vc.checkEnableSLA(ObjType);
            vc.setObjDetails(ObjName,ObjType);
```

TABLE 9-continued

```
//********* POPULATE FIELDS **************
            vc.loadFields(ObjName);
            vc.formSLAChangeState( );
```

In order to create the user interface, a form has to be created, which holds all the UI elements. To add information to the form and to integrate its look with the workflow editor, the code shown in Table 10 may be used. The FormToolKit class creates a toolkit using which the UI elements can be created. The form can be created from the toolkit as the form is also treated as a UI element that holds other UI elements.

TABLE 10

```
public void createViewForm(Composite composite){
    toolkit = new FormToolkit(composite.getDisplay( ));
    form=toolkit.createForm(composite);
//*****************Format the Form, set the layout
***************************************************
    TableWrapLayout layout = new TableWrapLayout( );
    layout.numColumns=4;
    layout.makeColumnsEqualWidth=false;
    form.getBody( ).setLayout(layout);
    form.setEnabled(false);
    form.setText("Privacy Properties");
    toolkit.decorateFormHeading(form);
```

The UI elements like text boxes, checkboxes, buttons and combo boxes may be created using example code shown in Table 11 below. These UI elements may be declared as private class attributes so as to enable the access of these attributes by the different UI-handling functions in the class.

TABLE 11

```
td=new TableWrapData(TableWrapData.FILL_GRAB);
td.colspan=1;
label = toolkit.createLabel(form.getBody( ), "Purpose: ", SWT.NULL);
label.setLayoutData(td);
td=new TableWrapData(TableWrapData.FILL_GRAB);
td.colspan=1;
frmPurpose = toolkit.createText(form.getBody( ), "");
frmPurpose.setLayoutData(td);
```

Figure 7:
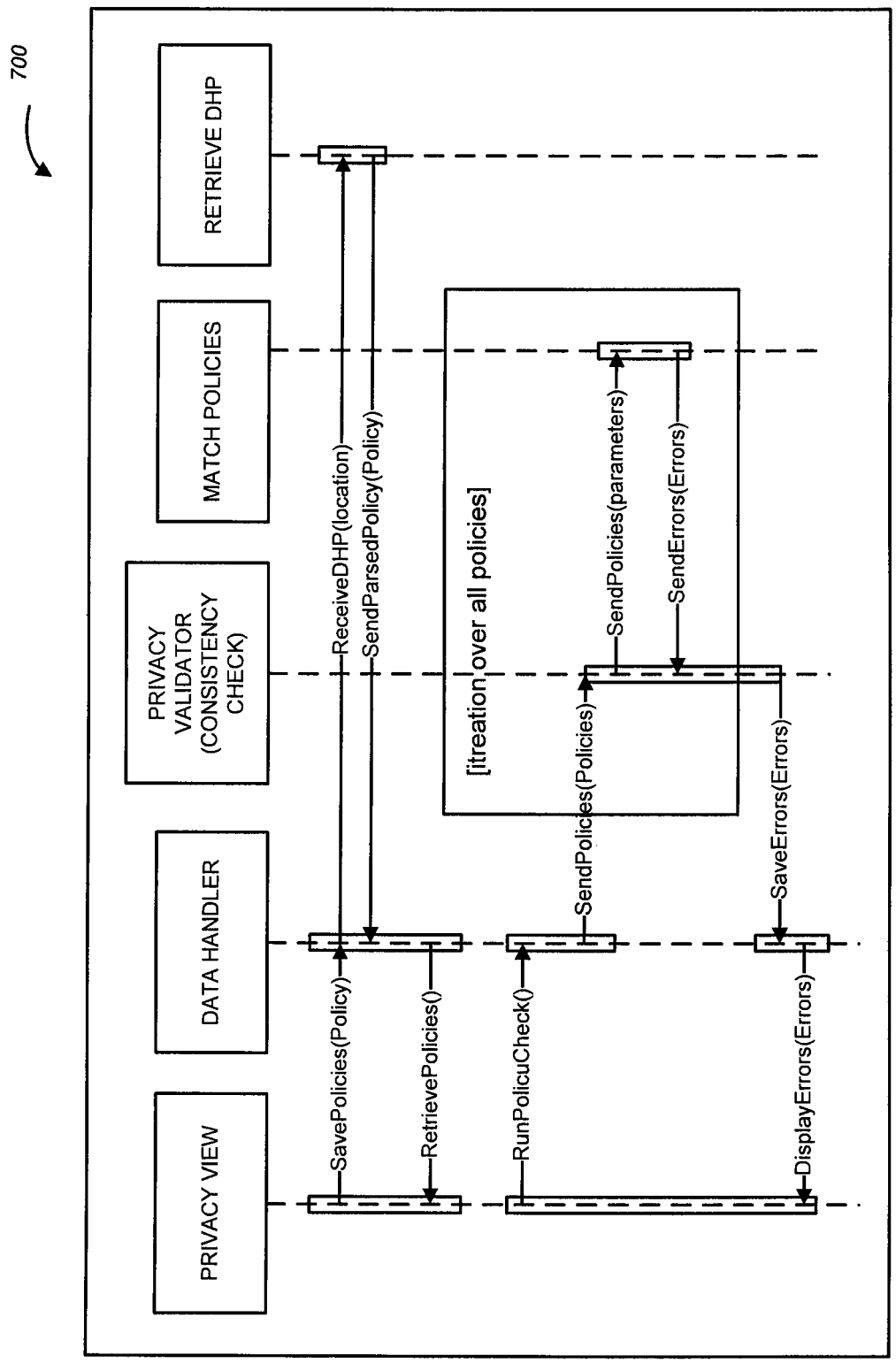
FIG. 7 is a diagrammatic representation of an example machine in the form of a computer system within which a set of instructions, for causing the machine to perform any one or more of the methodologies discussed herein, may be executed.

In one embodiment, PrivacyValidator.java class performs the operations of matching of the policies and reporting the conflicts between the policies, as shown in diagram 700 in FIG. 7. To perform the matching, a privacy validator (that may correspond to the consistency check module 322 shown in FIG. 3) may be configured to check consistency among policies associated with tasks (activities), data objects, and mappings between the data objects and activities. Field declarations are shown in Table 12 below.

TABLE 12

```
//***** FIELD DECLARATIONS *******//
private ArrayList<PolicyDataRepository> PdataList=new
ArrayList<PolicyDataRepository>( );
    private ArrayList<BPMDO> DOList=new ArrayList<BPMDO>( );
    private Connection connection;
    private Collaboration collaboration;
```

The constructor initiates global variables shown in Table 12 above.

Public method ValidationProcess shown in Table 13 below. The ValidationProcess method iterates over the objects and calls a MatchDOMapping method that returns the errors it finds among the data field policies. The errors are then returned back to the calling function and the errors contain all the details required for the process designer to correct the policies.

TABLE 13

```
public ArrayList<ErrorDetails> ValidationProcess( ){
    ArrayList<ErrorDetails> Errors=new ArrayList<ErrorDetails>( );
    System.out.println("\nValidationProcess ");
    for(BPMDO dobj: DOList){
        Errors.addAll(MatchDOMappings(dobj));
    }
    System.out.println("Im here at matchDO Mappings"+Errors.size( ));
    //******THROW ERRORS IN ERROR LOG *********//
    return Errors;
}
```

The MatchDOMapping method iterates over each field mapping in a data object, that is, it checks the activities that take the input from the data field (read) or loads the output of an activity into the data object. It iterates over the two lists and extracts one write policy and the read policies attached with that. The write policies may be merged to become one aggregated policy. Example code is shown in Table 14 below.

TABLE 14

```
private ArrayList<ErrorDetails> MatchDOMappings(BPMDO dobj) {
        ArrayList<ErrorDetails> Errors=new
        ArrayList<ErrorDetails>( );
        ArrayList<FieldMapping>
        Fmap=new ArrayList<FieldMapping>( );
        Fmap=dobj.getFieldMapping( );
        System.out.println("I am here");
for(FieldMapping fm: Fmap)
    {
//place holder for the policy merging algorithm
        if(fm.getAccessType( ).equals("WRITE"))
        {
        ArrayList<FieldMapping> Fmap2=new ArrayList<FieldMapping>( );
        Fmap2=dobj.getFieldMapping( );
            for(FieldMapping fm2: Fmap2)
            {
                if(fm.getFieldName( ).equals(fm2.getFieldName( )) &&
fm2.getAccessType( ).equals("READ"))
                {
                ArrayList<ErrorDetails> ED=new
ArrayList<ErrorDetails>( );
                ED=MatchPolicy(fm.getActivityID( ),
                fm2.getActivityID( ));
                    if(ED!=null)
                        Errors.addAll(ED);
                }
            }
        }
    }
return Errors;
}
```

After traversing to the one write policy and one read policy, these activities are then sent to another method MatchPolicy, which matches the policies of the activity that is reading the data field with respect to the activity that is writing into the data field.

In one example embodiment, the method and system for integrating data-handling policies into a workflow model may be summarized as follows.

A method is provided comprising commencing an authoring session to generate a workflow model having a plurality of tasks; utilizing at least one processor, generating a data-handling policy for a data context of a task from a plurality of tasks, the data context comprising one or more data objects; and storing the data-handling policy as associated with the workflow model. The method comprises executing a consistency check for the data-handling policy and other data-handling policies associated with the workflow model. The data-handling policy may define input consumption policy for input data from the data context of the task, the input consumption policy comprising one or more rules for utilizing the input data, the input data being stored in a first data object from the workflow. The data-handling policy may define output consumption policy for output data from the data context of the task, the output consumption policy comprising one or more rules for utilizing the output data, the input data being stored in a second data object from the workflow. The method further comprises receiving a selection of a task from the workflow model; displaying a privacy view workspace; and populating one or more fields in the privacy view workspace. The populating of one or more fields in the privacy view workspace comprises utilizing user input and/or utilizing previously stored data (SLA). The data handling policy specifies a purpose for which a data item from the data context is to be used, a user or a role that is permitted to access a data item from the data context, and/or retention period for a data item from the data context is to be used.

A computer-implemented system is provided comprising a session initiator to commence an authoring session for a workflow model having a plurality of tasks; a privacy manager to generate a data-handling policy for a data context of a task from a plurality of tasks, the data context comprising one or more data objects; and a storing module to store the data-handling policy as associated with the workflow model. The privacy manager comprises a consistency check module to execute consistency check for the data-handling policy and other data-handling policies associated with the workflow model. The privacy manager comprises a user interface module to display a privacy view workspace in response to a selection of a task from the workflow model; and populating one or more fields in the privacy view workspace. The user interface module is to populate the one or more fields in the privacy view workspace utilizing user input and/or utilizing previously stored data (SLA).

A machine-readable non-transitory medium is provided having instruction data to cause a machine to commence an authoring session for a workflow model having a plurality of tasks; generate a data-handling policy for a data context of a task from a plurality of tasks, the data context comprising one or more data objects; and store the data-handling policy as associated with the workflow model.

Figure 8:
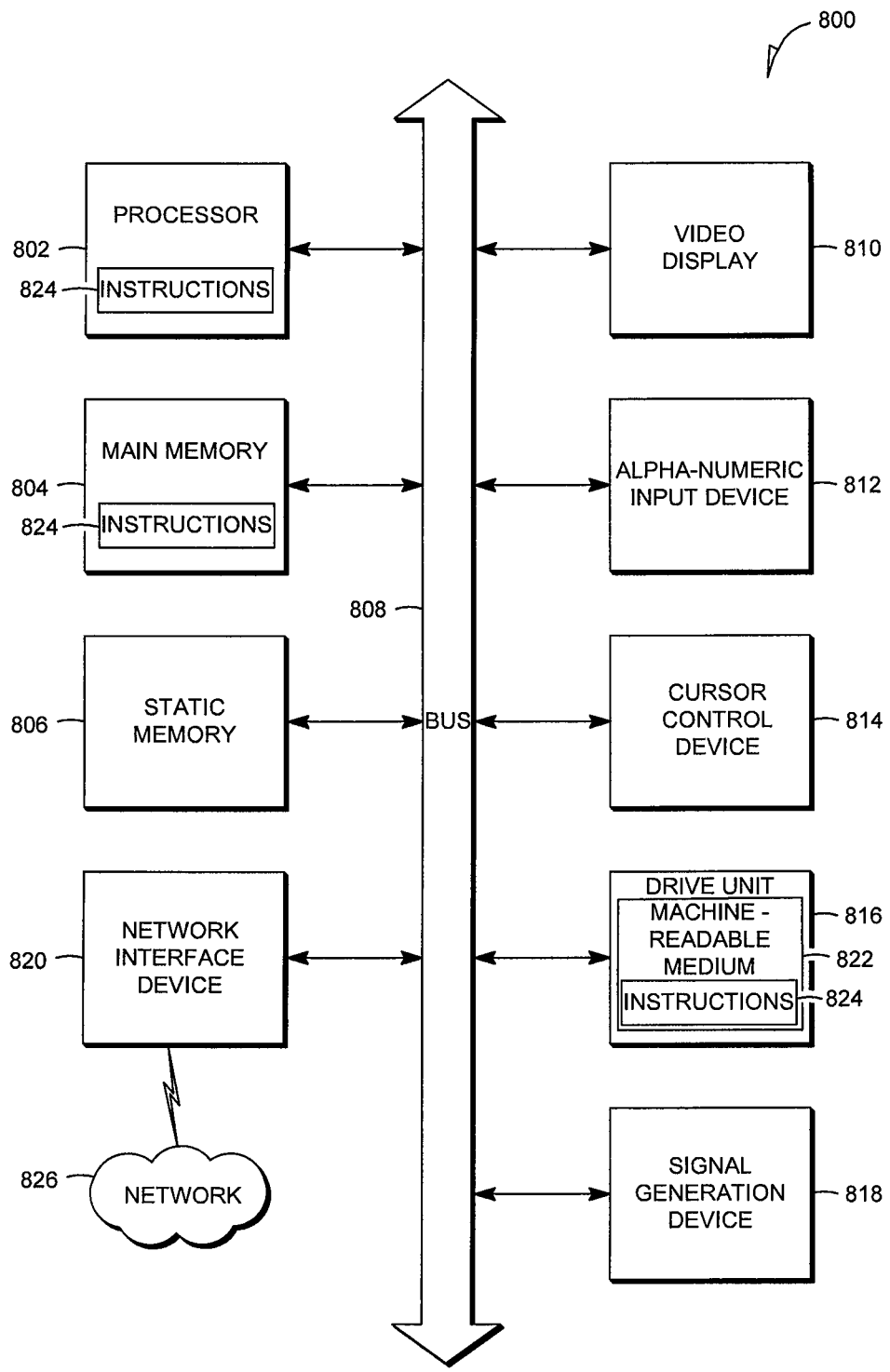

FIG. 8 shows a diagrammatic representation of a machine in the example form of a computer system 800 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a user interface (UI) navigation device 814 (e.g., a cursor control device), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, with the main memory 804 and the processor 802 also constituting machine-readable media.

The software 824 may further be transmitted or received over a network 826 via the network interface device 820 utilizing any one of a number of well-known transfer protocols (e.g., Hyper Text Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system for integrating data-handling policies into a workflow model has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
commencing an authoring session to generate a workflow model having a plurality of tasks;
receiving, during the authoring session, a selection of a task from the plurality of tasks;
obtaining, via a user interface, an input representing one or more rules restricting utilization of data from a data context of the task, the data context comprising data consumed by or produced by the task, the obtaining comprising:
causing displaying of a privacy view workspace as associated with the workflow model, the privacy view workspace comprising one or more fields, and
populating the one or more fields in the privacy view workspace;
utilizing at least one processor, generating a data-handling policy for the task using the one or more rules, a rule from the one or more rules indicating how the task is to consume input data from the data context, wherein the data-handling policy defines an output consumption policy for output data from the data context of the task, the output consumption policy comprising one or more rules for utilizing the output data, the output data being stored in a second data object from the workflow;
executing a consistency check for the data-handling policy; and
storing the data-handling policy as associated with the workflow model.

2. The method of claim 1, wherein the populating comprises utilizing user input.

3. The method of claim 1, wherein the populating comprises utilizing previously stored data.

4. The method of claim 1, wherein the data handling policy specifies a purpose for which a data item from the data context is to be used.

5. The method of claim 1, wherein the data handling policy specifies a user or a role that is permitted to access a data item from the data context.

6. The method of claim 1, wherein the data handling policy specifies retention period for a data item from the data context is to be used.

7. A computer-implemented system comprising:
a session initiator to commence an authoring session for a workflow model having a plurality of tasks, using at least one processor;
a privacy manager to generate, using at least one processor, a data-handling policy for the task using the one or more rules, a rule from the one or more rules indicating how the task is to consume input data from the data context, wherein the data-handling policy defines an output consumption policy for output data from the data context of the task, the output consumption policy comprising one or more rules for utilizing the output data, the output data being stored in a second data object from the workflow, the privacy manager comprises:
a user interface module to:
cause displaying of a privacy view workspace as associated with the workflow model, the privacy view workspace comprising one or more fields, and
populate the one or more fields in the privacy view workspace, and a consistency check module to execute consistency check for the data-handling policy;

a storing module to store the data-handling policy as associated with the workflow model, using at least one processor.

8. The system of claim 1, wherein the user interface module is to populate the one or more fields in the privacy view workspace utilizing user input.

9. The system of claim 1, wherein the user interface module is to populate the one or more fields in the privacy view workspace utilizing previously stored data.

10. The system of claim 7 wherein the data handling policy specifies one or more of a purpose for which a data item from the data context is to be used.

11. The system of claim 7, wherein the data handling policy specifies retention period for a data item from the data context is to be used.

12. A machine-readable non-transitory medium having instruction data to cause a machine to perform operations comprising:
  commencing an authoring session for a workflow model having a plurality of tasks;
  receiving, during the authoring session, a selection of a task from the plurality of tasks;
  obtaining, via a user interface, an input representing one or more rules restricting utilization of data from a data context of the task, the data context comprising data consumed by or produced by the task, the obtaining comprising:
    causing displaying of a privacy view workspace as associated with the workflow model, the privacy view workspace comprising one or more fields, and
    populating the one or more fields in the privacy view workspace;
  generating a data-handling policy for the task using the one or more rules, a rule from the one or more rules indicating how the task is to consume input data from the data context, wherein the data-handling policy defines an output consumption policy for output data from the data context of the task, the output consumption policy comprising one or more rules for utilizing the output data, the output data being stored in a second data object from the workflow;
  executing a consistency check for the data-handling policy; and
  storing the data-handling policy as associated with the workflow model.

\* \* \* \* \*